United States Patent
Tipp

(10) Patent No.: US 9,423,634 B2
(45) Date of Patent: Aug. 23, 2016

(54) ARTICLES OF EYEWEAR INCLUDING ACCESSORY ATTACHMENT FEATURES

(71) Applicant: CROCS, INC., Niwot, CO (US)

(72) Inventor: Alan Tipp, Elkhorn, NE (US)

(73) Assignee: CROCS, INC., Niwot, CO (US)

( * ) Notice: Subject to any disclaimer, the term of this patent is extended or adjusted under 35 U.S.C. 154(b) by 0 days.

(21) Appl. No.: 14/552,041

(22) Filed: Nov. 24, 2014

(65) Prior Publication Data

US 2015/0146157 A1  May 28, 2015

Related U.S. Application Data

(60) Provisional application No. 61/909,209, filed on Nov. 26, 2013.

(51) Int. Cl.
*G02C 11/02* (2006.01)
*G02C 5/14* (2006.01)

(52) U.S. Cl.
CPC .............. *G02C 11/02* (2013.01); *G02C 5/146* (2013.01)

(58) Field of Classification Search
CPC ....................................................... G02C 11/02
USPC ............ 351/51, 52, 112, 158; 2/13; D16/323, D16/324, 335, 336
See application file for complete search history.

(56) References Cited

U.S. PATENT DOCUMENTS

| | | | |
|---|---|---|---|
| 2,555,578 A * | 6/1951 | Davis ................ | G02C 9/00 351/52 |
| 5,110,198 A * | 5/1992 | Travis ................ | G02C 5/02 351/121 |
| 5,627,607 A * | 5/1997 | Grau ................ | G02C 11/02 351/52 |
| 7,588,331 B2 | 9/2009 | Burnstein | |
| 7,698,836 B2 | 4/2010 | Schmelzer et al. | |
| 7,901,070 B2 | 3/2011 | Burnstein | |
| 8,083,345 B2 | 12/2011 | Chen | |
| 8,122,519 B2 | 2/2012 | Schmelzer et al. | |
| 8,782,814 B2 | 7/2014 | Schmelzer et al. | |
| 2007/0222940 A1* | 9/2007 | Cohen ................ | G02C 11/02 351/52 |
| 2008/0170199 A1* | 7/2008 | Cohen ................ | G02C 11/02 351/52 |
| 2009/0008288 A1 | 1/2009 | Burnstein | |
| 2009/0009711 A1 | 1/2009 | Burnstein | |
| 2009/0066908 A1* | 3/2009 | Esses ................ | G02C 11/02 351/52 |
| 2009/0126248 A1 | 5/2009 | Burnstein | |
| 2009/0135369 A1 | 5/2009 | Burnstein | |
| 2009/0136905 A1 | 5/2009 | Burnstein | |
| 2011/0080555 A1* | 4/2011 | Chow ................ | G02C 11/02 351/52 |

(Continued)

FOREIGN PATENT DOCUMENTS

JP  2009198532 A  *  9/2009

*Primary Examiner* — Darryl J Collins
(74) *Attorney, Agent, or Firm* — Wilmer Cutler Pickering Hale and Dorr LLP

(57) ABSTRACT

An article of eyewear includes a frame. The frame includes a front frame defining a left aperture and a right aperture. The frame also includes a left temple arm and a right temple arm. The left temple arm is supported by the front frame and the right temple arm is supported by the front frame. The frame further includes an accessory attachment opening adapted to detachably receive an accessory. The accessory attachment opening extends through a portion of the frame in a thickness direction. The accessory attachment opening includes an open side adapted to facilitate ingress and egress of the accessory from the accessory attachment opening in a direction substantially perpendicular to the thickness direction.

15 Claims, 22 Drawing Sheets

(56) References Cited

U.S. PATENT DOCUMENTS

| | | | |
|---|---|---|---|
| 2011/0279769 A1* | 11/2011 | Rhee | G02C 11/02 351/52 |
| 2012/0017472 A1 | 1/2012 | Burnstein | |
| 2012/0169990 A1 | 7/2012 | Burnstein | |

* cited by examiner

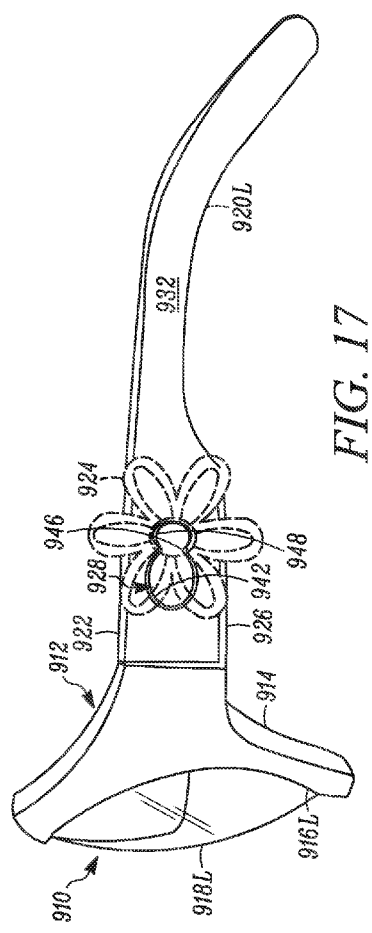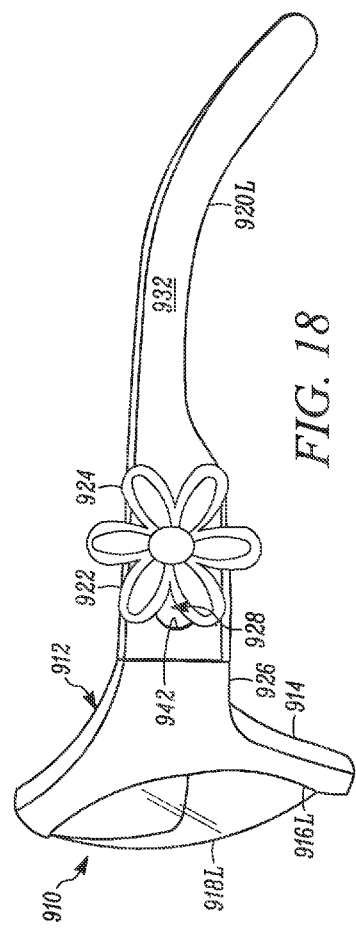

ARTICLES OF EYEWEAR INCLUDING ACCESSORY ATTACHMENT FEATURES

CROSS-REFERENCE TO RELATED APPLICATION

This application claims the benefit of U.S. Provisional Patent Application Ser. No. 61/909,209, filed on Nov. 26, 2013 and entitled "ARTICLES OF EYEWEAR INCLUDING ACCESSORY ATTACHMENT FEATURES", which is incorporated by reference herein in its entirety for all purposes.

TECHNICAL FIELD

The present invention relates to accessory attachment features for articles of eyewear. More specifically, the present invention relates to articles of eyewear including accessory attachment openings.

BACKGROUND

Various types of wearable articles, such as shoes, articles of eyewear, and the like, include features for detachably supporting decorative accessories or charms. Thus, these features facilitate customization and personalization of wearable articles. Unfortunately, such features are typically simple structures, and a significant amount of time and/or effort is needed to attach or detach accessories therefrom.

SUMMARY

In some embodiments, an article of eyewear includes a frame. The frame includes a front frame defining a left aperture and a right aperture. The frame also includes a left temple arm and a right temple arm. The left temple arm is supported by the front frame and the right temple arm is supported by the front frame. The frame further includes an accessory attachment opening adapted to detachably receive an accessory. The accessory attachment opening extends through a portion of the frame in a thickness direction. The accessory attachment opening includes an open side adapted to facilitate ingress and egress of the accessory from the accessory attachment opening in a direction substantially perpendicular to the thickness direction.

In some embodiments, an article of eyewear includes a frame. The frame includes a front frame that defines a left aperture and a right aperture. The frame also includes a left temple arm supported by the front frame and a right temple arm supported by the front frame. An accessory attachment opening is adapted to detachably receive an accessory and extends through a portion of the frame. The accessory attachment opening includes a receiving portion adapted to receive the accessory. The receiving portion has a first width. A mounting portion is adapted to receive the accessory from the receiving portion. The mounting portion has a second width. The accessory attachment portion tapers to a third width between the receiving portion and the mounting portion. The third width is less than the first width and the second width.

In some embodiments, an article of eyewear includes a frame. The frame includes a front frame that defines a left aperture and a right aperture. The frame also includes a left temple arm and a right temple arm. The left temple arm is supported by the front frame and the right temple arm is supported by the front frame. The frame further includes an accessory attachment opening adapted to detachably receive an accessory. The accessory attachment opening extends through a portion of the frame in a thickness direction. The accessory attachment opening has a cross-sectional shape that tapers inwardly in the thickness direction of the frame.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 17 illustrates a side view of an article of eyewear in accordance with an embodiment of the present invention; an accessory that is detachably connectable to the article of eyewear is transparent for illustrative purposes;

FIG. 18 illustrates a side view of the article of eyewear of FIG. 17;

DETAILED DESCRIPTION

Figure 1:
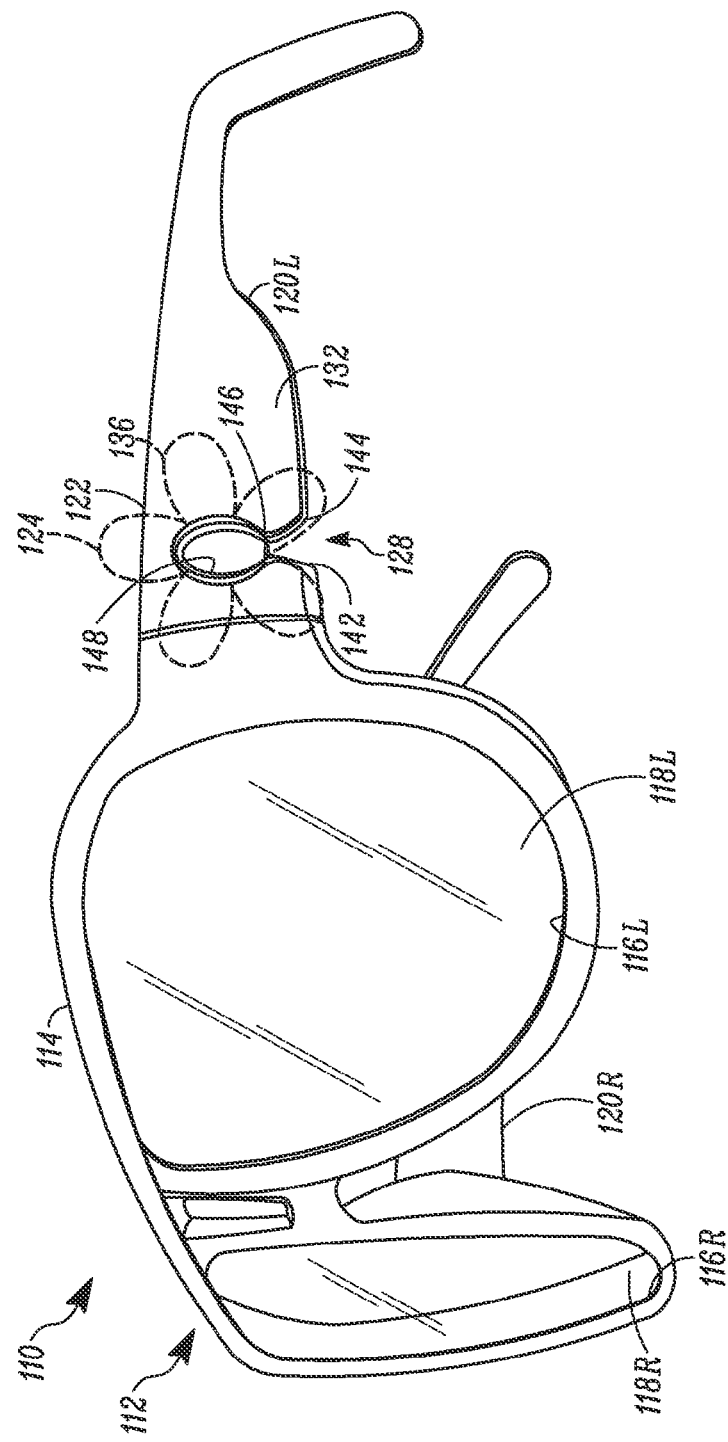
FIG. 1 illustrates a perspective view of an article of eyewear in accordance with an embodiment of the present invention; an accessory that is detachably connectable to the article of eyewear is shown in hidden lines.
Figure 2:
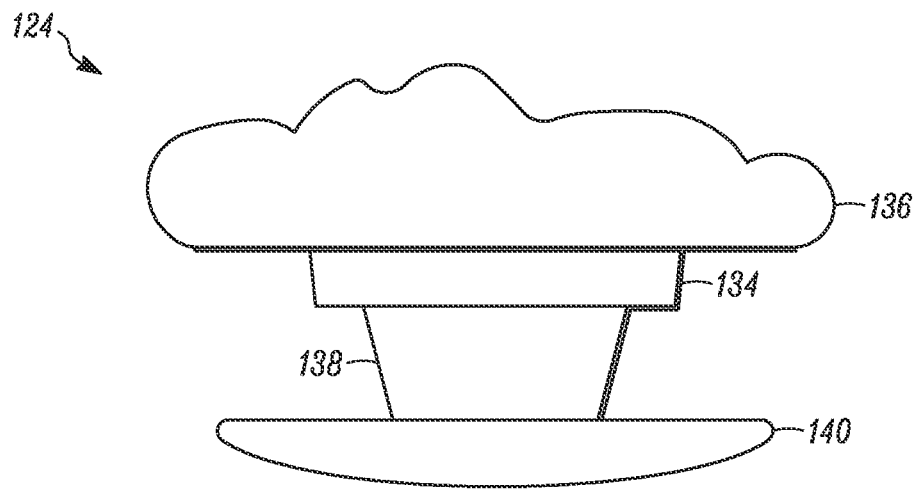
FIG. 2 illustrates a top view of an accessory that is detachably connectable to an accessory attachment feature in accordance with an embodiment of the present invention.

FIG. 1 illustrates an article of eyewear 110 in accordance with an embodiment of the present invention. The article of eyewear 110 includes a frame 112 that is configured to engage the face of a wearer (not shown) of the article of eyewear 110. The frame 112 may include various materials, such as plastics, metals, combinations thereof, and the like. In some embodiments, such as the embodiment shown in FIG. 1, the frame 112 may be shaped to provide the article of eyewear 110 with an "aviator" style. In some embodiments and as described in further detail below, the frame may be shaped to provide an article of eyewear with various other styles.

The frame 112 includes a front frame 114, which may also be referred to as a "face" or "lens-supporting frame". In some embodiments, the front frame 114 is shaped to engage and be supported by the ridge or bridge of the wearer's nose. In some embodiments, the front frame 114 is shaped to extend above the wearer's nose and mounts one or more contact pads (not shown) that are supported by the ridge or bridge of the wearer's nose.

The front frame 114 also defines a left aperture 116L and a right aperture 116R that are configured to be disposed proximate the wearer's left eye and right eye, respectively. In some embodiments, such as the embodiment shown in FIG. 1, the front frame 114 supports a left tinted lens 118L and a right tinted lens 118R within the left aperture 116L and the right aperture 116R, respectively. As such, in some embodiments, the article of eyewear 110 is a pair of sunglasses. In some embodiments, other types of lenses may be used, such as transparent lenses, translucent lenses, coated lenses (for example, lenses having scratch-resistant coatings), colored lenses, impact-resistant lenses, polarizing lenses, vision-correcting lenses (for example, reading lenses, distance lenses, multifocal lenses, and progressive lenses), combinations thereof, and the like. Any of the above lenses may include various materials, such as plastics, glass, and the like.

The sides of the front frame 114 connect to a left temple arm 120L and a right temple arm 120R. The left temple arm 120L and the right temple arm 120R are shaped to be disposed proximate the wearer's left temple and right temple, respectively. In some embodiments, the left temple arm 120L and the right temple arm 120R are also shaped to engage the wearer's left ear and right ear, respectively. In some embodiments, the left temple arm 120L and the right temple arm 120R hingedly or pivotably connect to the front frame 114 to facilitate folding the article of eyewear 110 to a relatively compact storage configuration.

The article of eyewear 110 also includes one or more accessory attachment features 122 for detachably or interchangeably mounting one or more decorative accessories or charms 124, such as Jibbitz™ available from Crocs, Inc., the decorative accessories and mounts described in U.S. application Ser. No. 13/512,300, U.S. Pat. No. 7,698,836, and U.S. Pat. No. 8,122,519, the disclosures of which are hereby incorporated by reference in their entirety, or the like. In some embodiments, such as the embodiment shown in FIG. 1, the article of eyewear 110 includes a single accessory attachment feature 122 that is integrally formed with the left temple arm 120L. In some embodiments, an accessory attachment feature 122 is additionally or alternatively integrally formed with the right temple arm 120R. In some embodiments, such as those described in further detail below, an article of eyewear includes one or more accessory attachment features that detachably connect to various portions of the frame.

As described briefly above, the left temple arm 120L includes the accessory attachment feature 122. The accessory attachment feature 122 includes a portion of a wall 126 of the left temple arm 120L. The wall 126 may include one or more elastically deformable materials, such as plastics or the like. The wall 126 also defines an accessory attachment opening 128 that extends through the wall 126 of the left temple arm 120L in a thickness direction. That is, the accessory attachment opening 128 extends from an inner or medial surface 130 of the left temple arm 120L, which is disposed proximate the wearer's head, to an outer or lateral surface 132 opposite the inner surface 130.

Turning now to FIGS. 1-4, in some embodiments the accessory 124 includes a first shoulder 134. The first shoulder 134 has a relatively large diameter to inhibit the shoulder 134 from passing through the accessory attachment opening 128. Instead, when the accessory 124 is connected to the article of eyewear 110, the first shoulder 134 is configured to be disposed proximate the outer surface 132 of the left temple arm 120L. On one side, the first shoulder 134 mounts a decorative portion 136. When the accessory 124 is connected to the article of eyewear 110, the decorative portion 136 faces outwardly and away from the article of eyewear 110. In some embodiments, such as the embodiment shown in FIG. 1, the decorative portion 136 is shaped as a flower. However, the decorative portion may include various other shapes, colors, symbols, characters, or the like.

Opposite the decorative portion 136, the first shoulder 134 mounts a tapered shank 138. When the accessory 124 is connected to the article of eyewear 110, the tapered shank 138 extends through the accessory attachment opening 128 and engages the surfaces that define the accessory attachment opening 128. Proximate the first shoulder 134, the tapered shank 138 has a relatively small diameter. The diameter of the tapered shank 138 decreases proceeding away from the first shoulder 134 and toward a second shoulder 140 opposite the first shoulder 134.

The second shoulder 140 has a relatively large diameter, in some cases, to inhibit the shoulder 134 from passing through the accessory attachment opening 128. Instead, when the accessory 124 is connected to the article of eyewear 110, the second shoulder 140 is configured to be disposed proximate the inner surface 130 of the left temple arm 120L.

In some embodiments, the accessory attachment opening 128 is shaped to inhibit the accessory 124 from unintentionally detaching from the accessory attachment feature 122. In particular, the accessory attachment opening 128 generally has an open-bottom "keyhole" shape. Such a shape includes a receiving portion 142 that has an open-bottom trapezoidal shape of the open-bottom keyhole shape. The receiving portion 142 includes an open lower side 144 that facilitates ingress and egress of the accessory shank 138 from the accessory attachment opening 128 in a direction that is substantially perpendicular to the thickness direction of the left temple arm 120L (that is, perpendicular within ten degrees). In some embodiments, the open side 144 has a width (that is, a dimension that is substantially perpendicular to the thickness direction of the left temple arm 120L) that is about 5.5 mm.

Proceeding upwardly and away from the open side 144, the accessory attachment opening 128 tapers to an intermediate width 146. In some embodiments, the intermediate width 146 is about 6.25 mm above the open side 144 in a height direction (that is, a direction that is substantially perpendicular to both of the thickness and width dimensions of the left temple arm 120L). In some embodiments, the intermediate width 146 is less than the average diameter of the tapered accessory shank 138 (that is, the diameter at the midpoint of the shank 138). For example, the intermediate width 146 may be about 4.5 mm. As such, the accessory attachment feature 122 elastically deforms and flexes as the accessory shank 138 passes through the intermediate width 146.

Proceeding upwardly and away from the intermediate width 146, the receiving portion 142 of the accessory attachment opening 128 connects to a mounting portion 148 that receives and detachably secures the accessory shank 138. The mounting portion 148 has a partially-circular shape of the open-bottom keyhole shape. The mounting portion 148 has a width, or diameter, that is greater than the intermediate width 146 and is substantially equal to the average diameter of the tapered shank 138 (that is, the diameter at the midpoint of the shank 138). In some embodiments, the mounting portion 148 has a width, or diameter, that is about 5.5 mm. As such, the accessory attachment feature 122 is not elastically deformed while the accessory shank 138 is secured within the mounting portion 148. In addition, the size of the mounting portion 148 inhibits the second shoulder 140 from being pulled through the mounting portion 148 to detach the accessory 124. Instead, the accessory 124 may be detached by first passing the accessory shank 138 downwardly through the intermediate width 146 and into the receiving portion 142. Thereafter, the accessory shank 138 may be passed through the receiving portion 142.

Figure 3:
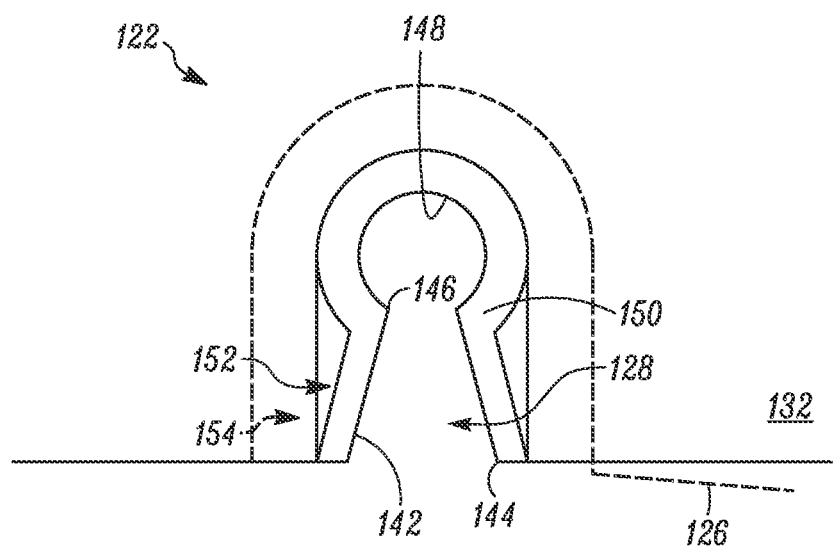
FIG. 3 illustrates a side view of the accessory attachment feature for detachably connecting an accessory to an article of eyewear in accordance with an embodiment of the present invention.
Figure 4:
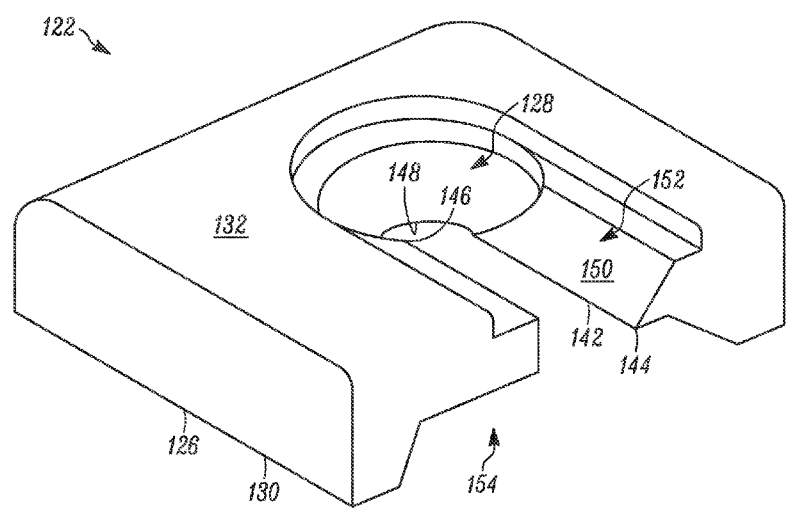
FIG. 4 illustrates an upper perspective view of an accessory attachment feature of FIG. 3.
Figure 5:
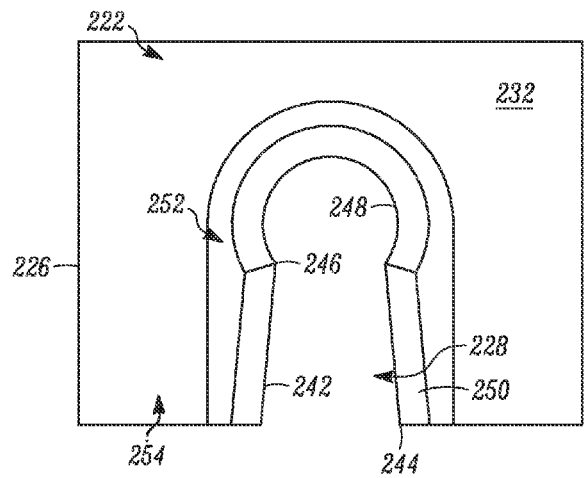
FIG. 5 illustrates a side view of an accessory attachment feature for detachably connecting an accessory to an article of eyewear in accordance with an embodiment of the present invention.
Figure 6:
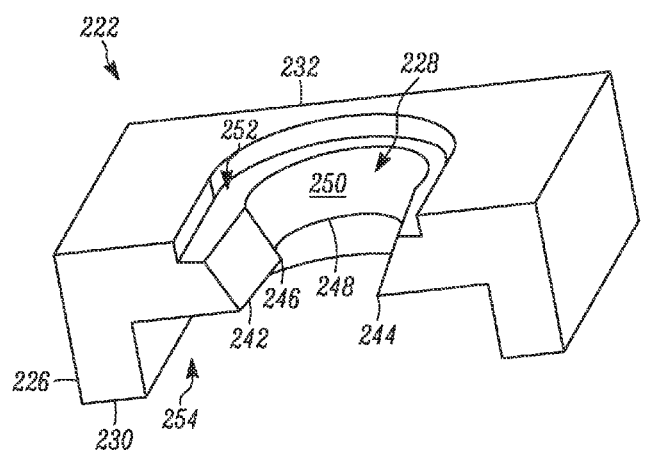
FIG. 6 illustrates an upper perspective view of the accessory attachment feature of FIG. 5.
Figure 7:
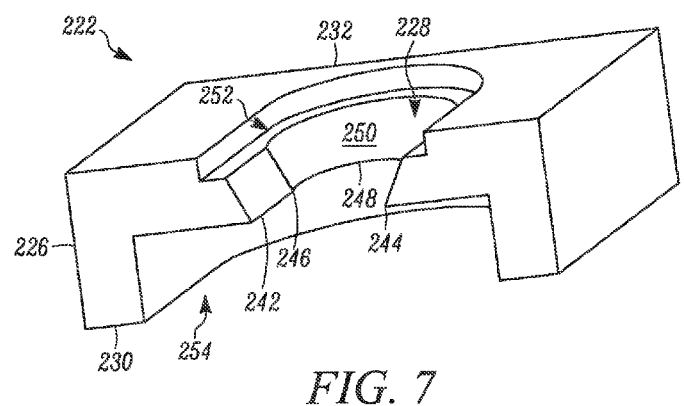
FIG. 7 illustrates another upper perspective view of the accessory attachment feature of FIG. 5.
Figure 8:
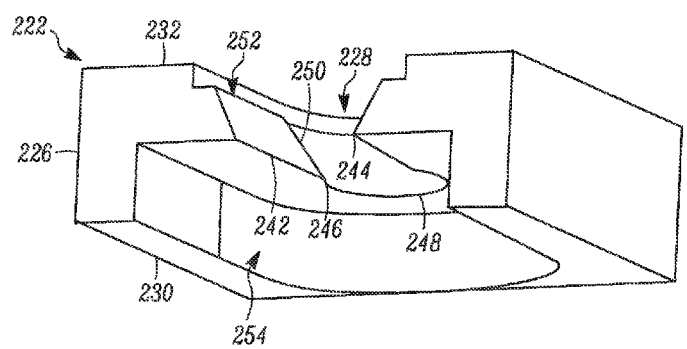
FIG. 8 illustrates a lower perspective view of the accessory attachment feature of FIG. 5.

Turning now to FIGS. 3 and 4, in some embodiments, the accessory attachment feature 122 is further shaped to facilitate securement to an accessory 124 having the shoulders 134, 140 and the tapered shank 138 described above. In particular, the accessory attachment opening 128 is defined by a tapered intermediate surface 150. The tapered intermediate surface 150 tapers inwardly proceeding from proximate the outer surface 132 to proximate the inner surface 130 of the left temple arm 120L. In some embodiments, the height and angle of the tapered intermediate surface 150 matches those of the accessory shank 138 to facilitate surface contact with the shank 138.

In some embodiments, the accessory attachment feature 122 further includes a first shoulder-receiving recess 152 that is disposed proximate the outer surface 132 of the left temple arm 120L. The first shoulder-receiving recess 152 generally has an inverted U-shape and extends about the accessory attachment opening 128. The first shoulder-receiving recess 152 is configured to receive the first accessory shoulder 134 when the accessory shank 138 is disposed within the accessory attachment opening 128.

In some embodiments, the accessory attachment feature 122 further includes a second shoulder-receiving recess 154 that is disposed proximate the inner surface 130 of the left temple arm 120L. The second shoulder-receiving recess 154 generally has an inverted U-shape and extends about the accessory attachment opening 128. The second shoulder-receiving recess 154 is configured to receive the second accessory shoulder 140 when the accessory shank 138 is disposed within the accessory attachment opening 128.

FIGS. 5-8 illustrate an accessory attachment feature 222 in accordance with an embodiment of the present invention. The accessory attachment feature 222 may be integrally formed with or detachably connected to a portion of a frame of an article of eyewear (such as the front frame or one of the temple arms described above). The accessory attachment feature 222 includes a wall 226 formed one or more elastically deformable materials, such as plastics or the like. In some embodiments, the wall 226 may have a height of about 15.25 mm. The wall 226 also defines an accessory attachment opening 228 that extends through the wall 226 in a thickness direction. That is, the accessory attachment opening 228 extends from an inner or medial surface 230 to an outer or lateral surface 232 opposite the inner surface 230.

In some embodiments, the accessory attachment opening 228 is shaped to inhibit an accessory, such as the accessory 124 described above, from unintentionally detaching from the accessory attachment feature 222. In particular, the accessory attachment opening 228 generally has an open-bottom "keyhole" shape. Such a shape includes a receiving portion 242 that has an open-bottom trapezoidal shape of the open-bottom keyhole shape. The receiving portion 242 includes an open lower side 244 that facilitates ingress and egress of the accessory shank 138 from the accessory attachment opening 228 in a direction that is substantially perpendicular to the thickness direction of the wall 226 (that is, perpendicular within ten degrees). In some embodiments, the open side 244 has a width that is about 5.5 mm.

Proceeding upwardly and away from the open side 244, the accessory attachment opening 228 tapers to an intermediate width 246. In some embodiments, the intermediate width 246 is about 6.25 mm above the open side 244 in a height direction. In some embodiments, the intermediate width 246 is about 4.5 mm. As such, the accessory attachment feature 222 elastically deforms and flexes as the accessory shank 138 passes through the intermediate width 246.

Proceeding upwardly and away from the intermediate width 246, the receiving portion 242 of the accessory attachment opening 228 connects to a mounting portion 248 that receives and detachably secures the accessory shank 138. The mounting portion 248 has a partially-circular shape of the open-bottom keyhole shape. The mounting portion 248 has a width, or diameter, that is greater than the intermediate width 246. In some embodiments, the mounting portion 248 has a width, or diameter, that is about 5.5 mm.

In some embodiments, the accessory attachment feature 222 is further shaped to facilitate securement to an accessory 124 having the shoulders 134, 140 and the tapered shank 138 described above. In particular, the accessory attachment opening 228 is defined by a tapered intermediate surface 250. The tapered intermediate surface 250 tapers inwardly proceeding from proximate the outer surface 232 to proximate the inner surface 230 of the wall 226. In some embodiments, the height and angle of the tapered intermediate surface 250 matches those of the accessory shank 138 to facilitate surface contact with the shank 138. In some embodiments, the tapered intermediate surface 250 has a thickness of about 2.4 mm and a width of about 1.2 mm on each side of the accessory attachment opening 228.

In some embodiments, the accessory attachment feature 222 further includes a first shoulder-receiving recess 252 that is disposed proximate the outer surface 232 of the wall 226. The first shoulder-receiving recess 252 generally has an inverted U-shape and extends about the accessory attachment opening 228. The first shoulder-receiving recess 252 may have a thickness of about 1 mm. The first shoulder-receiving recess 252 is configured to receive the first accessory shoulder 134 when the accessory shank 138 is disposed within the accessory attachment opening 228.

In some embodiments, the accessory attachment feature 222 further includes a second shoulder-receiving recess 254 that is disposed proximate the inner surface 230 of the wall 226. The second shoulder-receiving recess 254 generally has an inverted U-shape and extends about the accessory attachment opening 228. The second shoulder-receiving recess 254 may have a thickness of about 3.1 mm. The second shoulder-receiving recess 254 is configured to receive the second accessory shoulder 140 when the accessory shank 138 is disposed within the accessory attachment opening 228.

Figure 9:
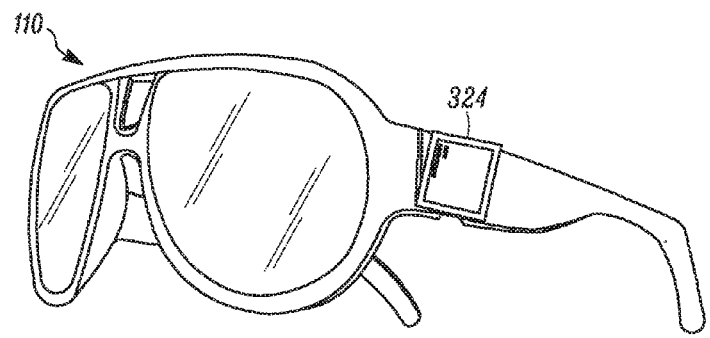
FIG. 9 illustrates a perspective view of the article of eyewear of FIG. 1 detachably supporting a different accessory.

FIG. 9 illustrates the article of eyewear 110 detachably supporting a different accessory 324.

Figure 10:
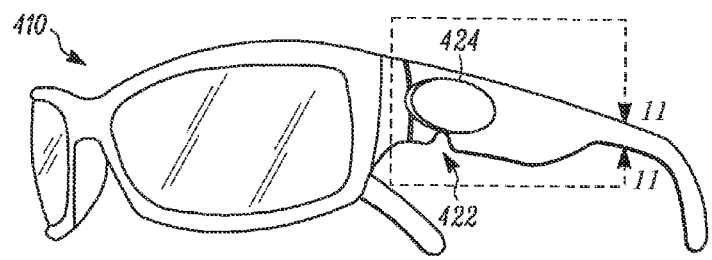
FIG. 10 illustrates a perspective view of an article of eyewear detachably supporting an accessory in accordance with an embodiment of the present invention.
Figure 11:
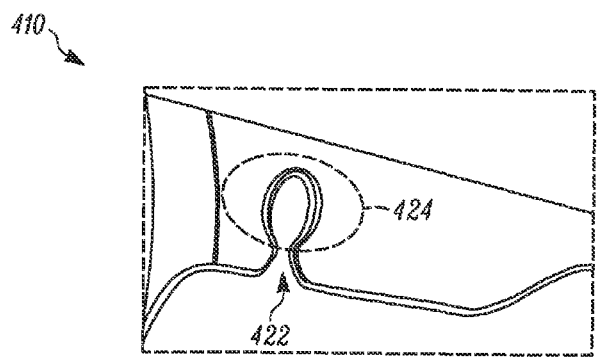
FIG. 11 illustrates a detail perspective view of the article of eyewear enclosed by line 11-11 of FIG. 10; the accessory shown in FIG. 10 is shown in hidden lines.

As described briefly above, articles of eyewear in accordance with embodiments of the present invention may be shaped to provide various types of styles. FIGS. 10 and 11, for example, illustrate an article of eyewear 410 in accordance with an embodiment of the present invention. The article of eyewear 410 includes an accessory attachment feature 422, such as one of the accessory attachment features 122 or 222 described above, for detachably supporting an accessory 424. The article of eyewear 410 is shaped to provide a "sport wrap" style.

Figure 12:
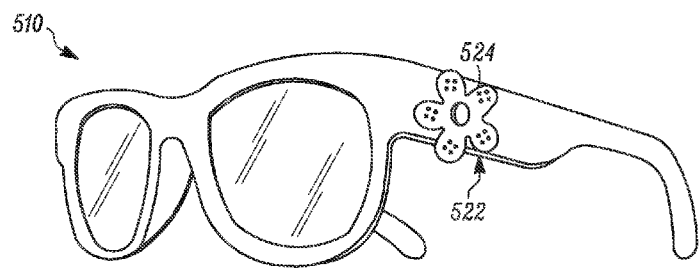
FIG. 12 illustrates a perspective view of an article of eyewear detachably supporting an accessory in accordance with an embodiment of the present invention.

FIG. 12 illustrates an article of eyewear 510 in accordance with an embodiment of the present invention. The article of eyewear 510 includes an accessory attachment feature 522, such as one of the accessory attachment features 122 or 222 described above, for detachably supporting an accessory 524. The article of eyewear 510 is shaped to provide a "wayfarer" style.

Figure 13:
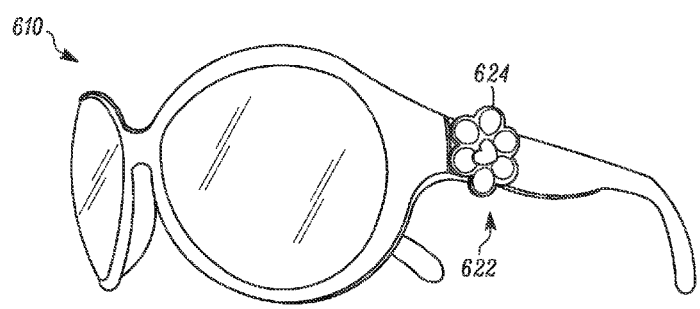
FIG. 13 illustrates a perspective view of an article of eyewear detachably supporting an accessory in accordance with an embodiment of the present invention.

FIG. 13 illustrates an article of eyewear 610 in accordance with an embodiment of the present invention. The article of eyewear 610 includes an accessory attachment feature 622, such as one of the accessory attachment features 122 or 222 described above, for detachably supporting an accessory 624. The article of eyewear 610 is shaped to provide an "oversized" style.

Figure 14:
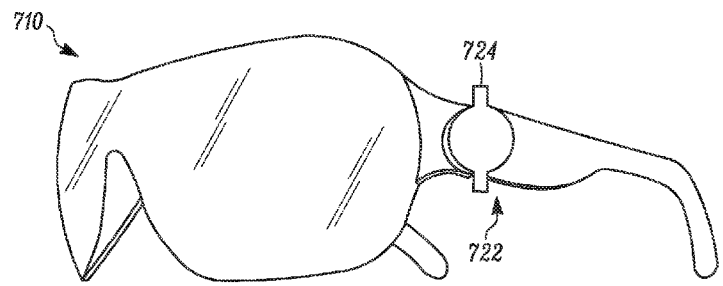
FIG. 14 illustrates a perspective view of an article of eyewear detachably supporting an accessory in accordance with an embodiment of the present invention.

FIG. 14 illustrates an article of eyewear 710 in accordance with an embodiment of the present invention. The article of eyewear 710 includes an accessory attachment feature 722, such as one of the accessory attachment features 122 or 222 described above, for detachably supporting an accessory 724. The article of eyewear 710 is shaped to provide a "shield" style.

Figure 15:
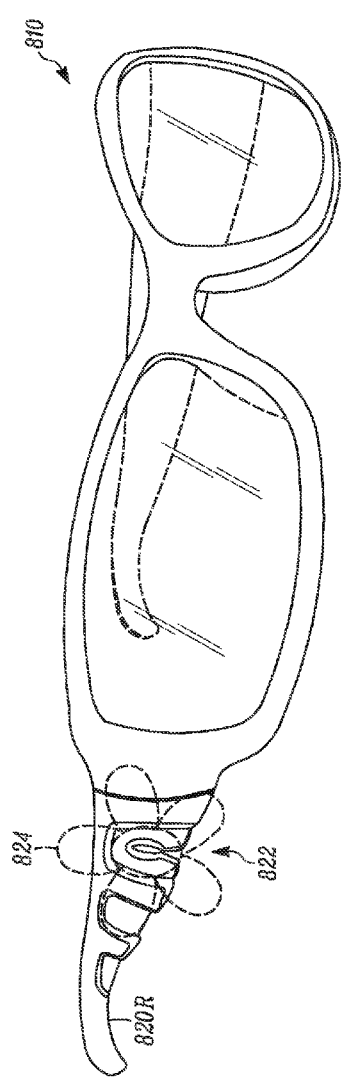
FIG. 15 illustrates a perspective view of an article of eyewear in accordance with an embodiment of the present invention; an accessory that is detachably connectable to the article of eyewear is shown in hidden lines.
Figure 16:
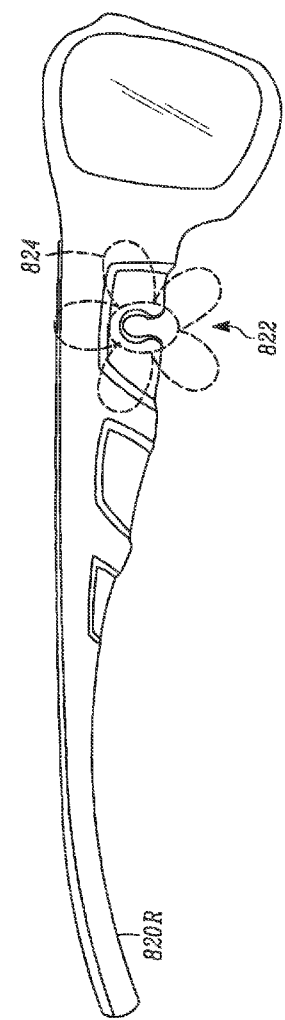
FIG. 16 illustrates a side view of the article of eyewear of FIG. 15; an accessory that is detachably connectable to the article of eyewear is shown in hidden lines.

FIGS. 15 and 16 illustrate an article of eyewear 810 in accordance with an embodiment of the present invention. The article of eyewear 810 includes a right temple arm 820R that defines an accessory attachment feature 822, such as the accessory attachment feature 122 described above. The accessory attachment feature 822 detachably supports an accessory 824. The article of eyewear 810 is shaped to provide a "sport" style.

FIGS. 17 and 18 illustrate an article of eyewear 910 in accordance with an embodiment of the present invention. The article of eyewear 910 includes a frame 912 that in turn includes a front frame 914. The front frame 914 defines a left aperture 916L and a right aperture (not shown) that receive a left lens 918L and a right lens (not shown), respectively. The sides of the front frame 914 pivotably connect to a left temple arm 920L and a right temple arm (not shown).

The left temple arm 920L defines an accessory attachment feature 922 for detachably or interchangeably mounting one or more accessories 924, such as the accessory 124 described above. The accessory attachment feature 922 includes a portion of a wall 926 of the left temple arm 920L. The wall 926 may include one or more elastically deformable materials, such as plastics or the like. The wall 926 also defines an accessory attachment opening 928 that extends through the wall 926 of the left temple arm 920L in a thickness direction. That is, the accessory attachment opening 928 extends from an inner or medial surface (not shown) of the left temple arm 920L, which is disposed proximate the wearer's head, to an outer or lateral surface 932 opposite the inner surface.

In some embodiments, the accessory attachment opening 928 is shaped to inhibit the accessory 924 from unintentionally detaching from the accessory attachment feature 922. In particular, the accessory attachment opening 928 generally has an "overlapping circles" shape. Such a shape includes a receiving portion 942 that has a first circular shape of the overlapping circles shape. In some embodiments, the receiving portion 942 has a width, or diameter, that is larger than that of the second shoulder 140 of the accessory 924. As such, the second shoulder 140 and a portion of the tapered shank 138 of the accessory 924 can be passed through the receiving portion 942.

Proceeding rearwardly from the receiving portion 942, the accessory attachment opening 928 tapers to an intermediate width, or height, 946. In some embodiments, the intermediate width 946 is less than the average diameter of the accessory shank 138 (that is, the diameter at the midpoint of the shank 138). As such, after the second shoulder 140 and the portion of the accessory shank 138 have been passed through the receiving portion 942, the accessory 924 can be passed rearwardly to move through the intermediate width 946 by elastically deforming, or flexing, the accessory attachment feature 922.

Proceeding rearwardly from the intermediate width 946, the receiving portion 942 of the accessory attachment opening 928 connects to a mounting portion 948 that receives and detachably secures the accessory shank 138. The mounting portion 948 has a second circular shape of the overlapping circles shape. The mounting portion 948 has a width, or diameter, that is greater than the intermediate width 946. In some embodiments, the mounting portion 948 has a width, or diameter, that is substantially equal to the average diameter of the tapered shank 138. As such, the accessory attachment feature 922 is not elastically deformed while the accessory shank 138 is secured within the mounting portion 948. In addition, the size of the mounting portion 948 inhibits the second shoulder 140 from being pulled through the mounting portion 948 to detach the accessory 924. Instead, the accessory 924 may be detached by first passing the accessory shank 138 forwardly through the intermediate width 946 and into the receiving portion 942. Thereafter, the second shoulder 140 may be pulled through the receiving portion 942.

Figure 19:
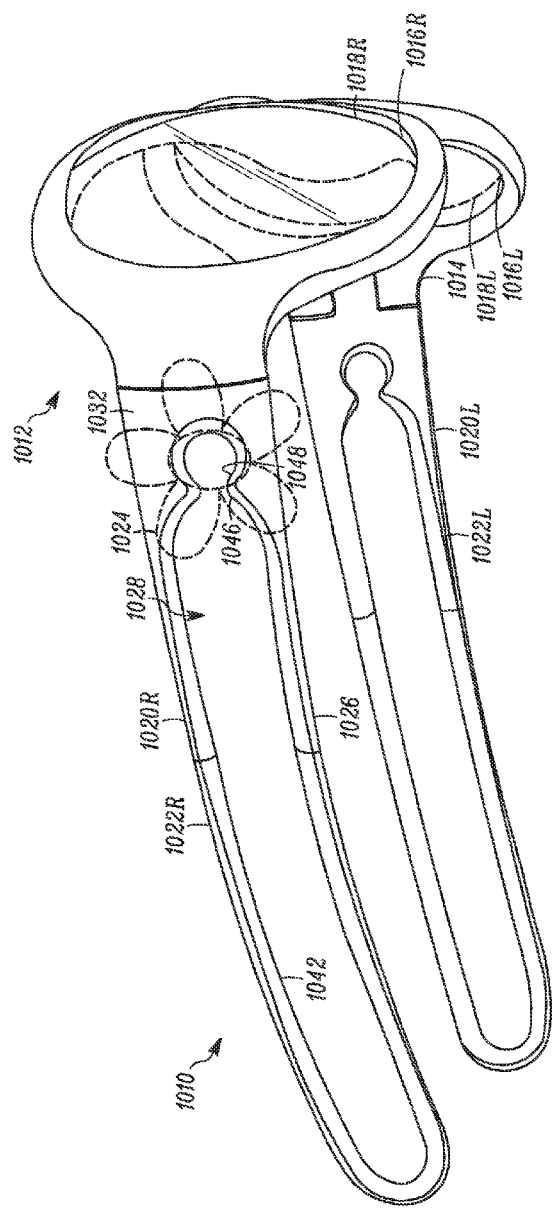
FIG. 19 illustrates a perspective view of an article of eyewear in accordance with an embodiment of the present invention; an accessory that is detachably connectable to the article of eyewear is shown in hidden lines.

FIG. 19 illustrates an article of eyewear 1010 in accordance with an embodiment of the present invention. The article of eyewear 1010 includes a frame 1012 that in turn includes a front frame 1014. The front frame 1014 defines a left aperture 1016L and a right aperture 1016R that receive a left lens 1018L and a right lens 1018R, respectively. The sides of the front frame 1014 pivotably connect to a left temple arm 1020L and a right temple arm 1020R. The left temple arm 1020L and the right temple arm 1020R may each include multiple detachable components.

The left temple arm 1020L and the right temple arm 1020R define a left accessory attachment feature 1022L and a right accessory attachment feature 1022R, respectively. The left accessory attachment feature 1022L and the right accessory attachment feature 1022R each detachably or interchangeably mounts an accessory 1024, such as the accessory 124 described above. The accessory attachment features 1022L and 1022R are generally similar and, as such, only the right accessory attachment feature 1022R will be described in detail for simplicity. The accessory attachment feature 1022R includes a portion of a wall 1026 of the right temple arm 1020R. The wall 1026 may include one or more elastically deformable materials, such as plastics or the like. The wall 1026 also defines an accessory attachment opening 1028 that extends through the wall 1026 of the right temple arm 1020R in a thickness direction. That is, the accessory attachment opening 1028 extends from an inner or medial surface (not shown) of the right temple arm 1020R, which is disposed proximate the wearer's head, to an outer or lateral surface 1032 opposite the inner surface.

In some embodiments, the accessory attachment opening 1028 is shaped to inhibit the accessory 1024 from unintentionally detaching from the accessory attachment feature 1022R. In particular, the accessory attachment opening 1028 includes a receiving portion 1042 that has an elongated shape similar to that of the right temple arm 1020R. In some embodiments, the receiving portion 1042 has a width, or height, that is larger than the diameter of the second shoulder 140 of the accessory 1024. As such, the second shoulder 140 and a portion of the tapered shank 138 of the accessory 1024 can be passed through the receiving portion 1042.

Proceeding forwardly from the receiving portion 1042, the accessory attachment opening 1028 tapers to an intermediate width, or height, 1046. In some embodiments, the intermediate width 1046 is less than the average diameter of the accessory shank 138 (that is, the diameter at the midpoint of the shank 138). As such, after the second shoulder 140 and the portion of the accessory shank 138 have been passed through the receiving portion 1042, the accessory 1024 can be passed forwardly to move through the intermediate width 1046 by elastically deforming, or flexing, the accessory attachment feature 1022R.

Proceeding forwardly from the intermediate width 1046, the receiving portion 1042 of the accessory attachment opening 1028 connects to a mounting portion 1048 that receives and detachably secures the accessory shank 138. The mounting portion 1048 has a width, or diameter, that is greater than the intermediate width 1046. In some embodiments, the mounting portion 1048 has a width, or diameter, that is substantially equal to the average diameter of the tapered shank 138. As such, the accessory attachment feature 1022R is not elastically deformed while the accessory shank 138 is secured within the mounting portion 1048. In addition, the size of the mounting portion 1048 inhibits the second shoulder 140 from being pulled through the mounting portion 1048 to detach the accessory 1024. Instead, the accessory 1024 may be detached by first passing the accessory shank 138 rearwardly through the intermediate width 1046 and into the receiving portion 1042. Thereafter, the second shoulder 140 may be pulled through the receiving portion 1042.

Figure 20:
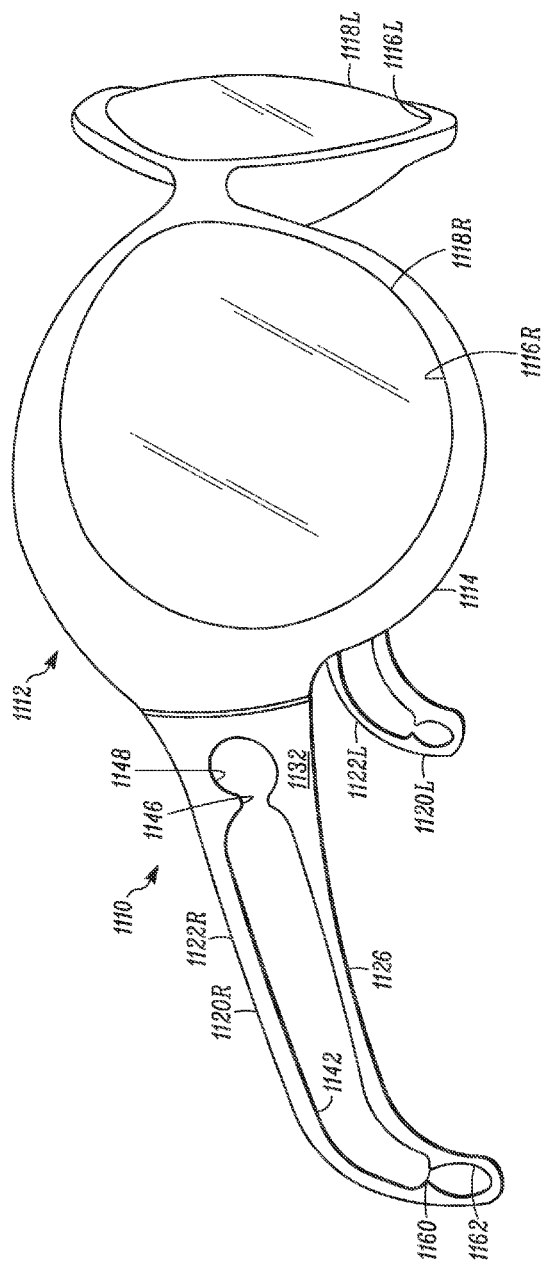
FIG. 20 illustrates a perspective view of an article of eyewear in accordance with an embodiment of the present invention.
Figure 21:
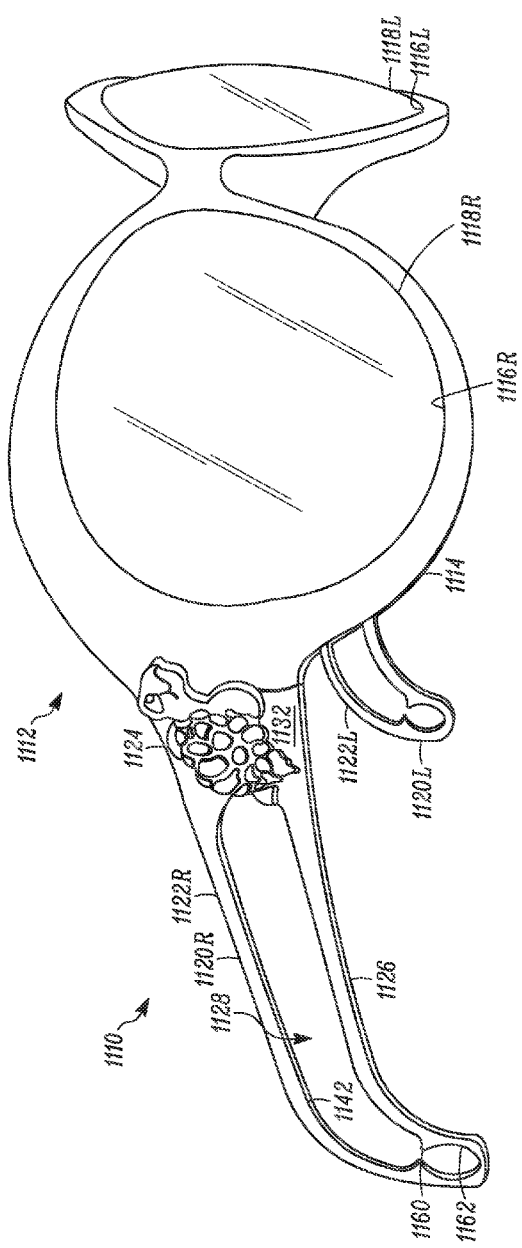
FIG. 21 illustrates a perspective view of the article of eyewear of FIG. 20 detachably supporting an accessory.
Figure 22:
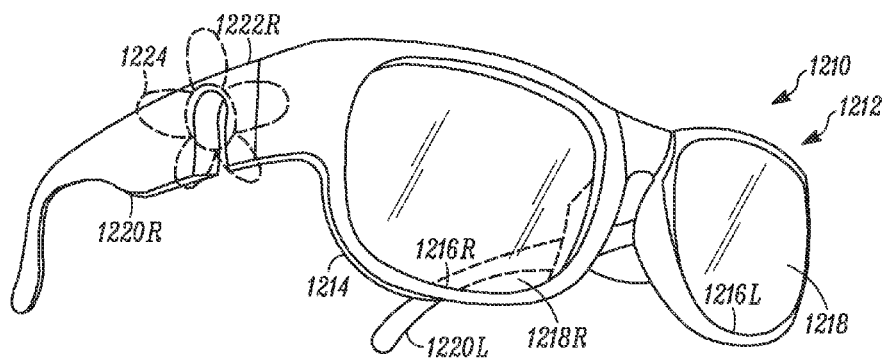
FIG. 22 illustrates a perspective view of an article of eyewear in accordance with an embodiment of the present invention; an accessory that is detachably connectable to the article of eyewear is shown in hidden lines.

FIGS. 20 and 21 illustrate an article of eyewear 1110 in accordance with an embodiment of the present invention. The article of eyewear 1110 includes a frame 1112 that in turn includes a front frame 1114. The front frame 1114 defines a left aperture 1116L and a right aperture 1116R that receive a left lens 1118L and a right lens 1118R, respectively. The sides of the front frame 1114 pivotably connect to a left temple arm 1120L and a right temple arm 1120R.

The left temple arm 1120L and the right temple arm 1120R define a left accessory attachment feature 1122RL and a right accessory attachment feature 1122R, respectively. The left accessory attachment feature 1122RL and the right accessory attachment feature 1122R each detachably or interchangeably mounts an accessory 1124, such as the accessory 124 described above. The accessory attachment features 1122RL and 1122R are generally similar and, as such, only the right accessory attachment feature 1122R will be described in detail for simplicity. The accessory attachment feature 1122R includes a portion of a wall 1126 of the right temple arm 1120R. The wall 1126 may include one or more elastically deformable materials, such as plastics or the like. The wall 1126 also defines an accessory attachment opening 1128 that extends through the wall 1126 of the right temple arm 1120R in a thickness direction. That is, the accessory attachment opening 1128 extends from an inner or medial surface (not shown) of the right temple arm 1120R, which is disposed proximate the wearer's head, to an outer or lateral surface 1132 opposite the inner surface.

In some embodiments, the accessory attachment opening 1128 is shaped to inhibit the accessory 1124 from unintentionally detaching from the accessory attachment feature 1122R. In particular, the accessory attachment opening 1128 includes a receiving portion 1142 that has an elongated shape similar to that of the right temple arm 1120R. In some embodiments, the receiving portion 1142 has a width, or height, that is larger than the diameter of the second shoulder 140 of the accessory 1124. As such, the second shoulder 140 and a portion of the tapered shank 138 of the accessory 1124 can be passed through the receiving portion 1142.

Proceeding forwardly from the receiving portion 1142, the accessory attachment opening 1128 tapers to a first or front intermediate width, or height, 1146. In some embodiments, the intermediate width 1146 is less than the average diameter of the accessory shank 138 (that is, the diameter at the midpoint of the shank 138). As such, after the second shoulder 140 and the portion of the accessory shank 138 have been passed through the receiving portion 1142, the accessory 1124 can be passed forwardly to move through the intermediate width 1146 by elastically deforming, or flexing, the accessory attachment feature 1122R.

Proceeding forwardly from the intermediate width 1146, the receiving portion 1142 of the accessory attachment opening 1128 connects to a first or front mounting portion 1148 that receives and detachably secures the accessory shank 138. The mounting portion 1148 has a width, or diameter, that is greater than the intermediate width 1146. In some embodiments, the mounting portion 1148 has a width, or diameter, that is substantially equal to the average diameter of the tapered shank 138. As such, the accessory attachment feature 1122R is not elastically deformed while the accessory shank 138 is secured within the mounting portion 1148. In addition, the size of the mounting portion 1148 inhibits the second shoulder 140 from being pulled through the mounting portion 1148 to detach the accessory 1124. Instead, the accessory 1124 may be detached by first passing the accessory shank 138 rearwardly through the intermediate width 1146 and into the receiving portion 1142. Thereafter, the second shoulder 140 may be pulled through the receiving portion 1142.

Proceeding rearwardly from the receiving portion 1142, the accessory attachment opening 1128 also tapers to a second or rear intermediate width, or height, 1160. In some embodiments, the intermediate width 1160 is less than the average diameter of the accessory shank 138. As such, after the second shoulder 140 and the portion of the accessory shank 138 have been passed through the receiving portion 1142, the accessory 1124 can be passed rearwardly to move through the intermediate width 1160 by elastically deforming, or flexing, the accessory attachment feature 1122R.

Proceeding rearwardly from the intermediate width 1160, the receiving portion 1142 of the accessory attachment opening 1128 connects to a second or rear mounting portion 1162 that receives and detachably secures the accessory shank 138. The mounting portion 1162 has a width, or diameter, that is greater than the intermediate width 1160. In some embodiments, the mounting portion 1162 has a width, or diameter, that is substantially equal to the average diameter of the tapered shank 138. As such, the accessory attachment feature 1122R is not elastically deformed while the accessory shank 138 is secured within the mounting portion 1162. In addition, the size of the mounting portion 1162 inhibits the second shoulder 140 from being pulled through the mounting portion 1162 to detach the accessory 1124. Instead, the accessory 1124 may be detached by first passing the accessory shank 138 forwardly through the intermediate width 1160 and into the receiving portion 1142. Thereafter, the second shoulder 140 may be pulled through the receiving portion 1142.

FIGS. 22-25 illustrate an article of eyewear 1210 in accordance with an embodiment of the present invention. The article of eyewear 1210 includes a frame 1212 that in turn includes a front frame 1214. The front frame 1214 defines a left aperture 1216L and a right aperture 1216R that receive a left lens 1218L and a right lens 1218R, respectively. The sides of the front frame 1214 pivotably connect to a left temple arm 1220L and a right temple arm 1220R.

Figure 23:
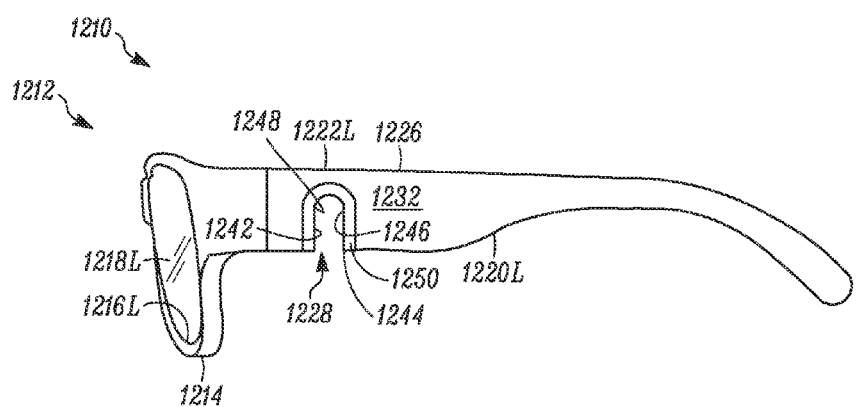
FIG. 23 illustrates a side view of the article of eyewear of FIG. 22.
Figure 24:
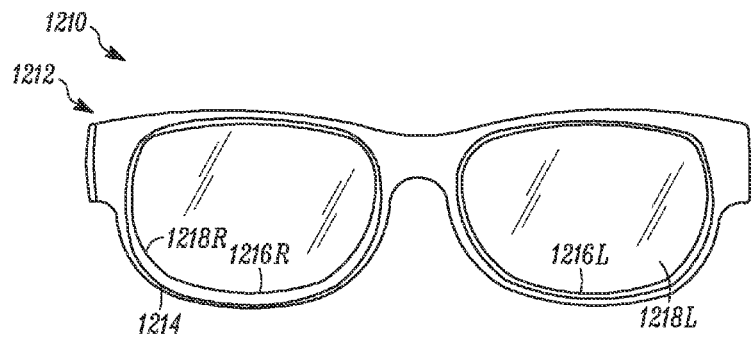
FIG. 24 illustrates a front view of the article of eyewear of FIG. 22.
Figure 25:
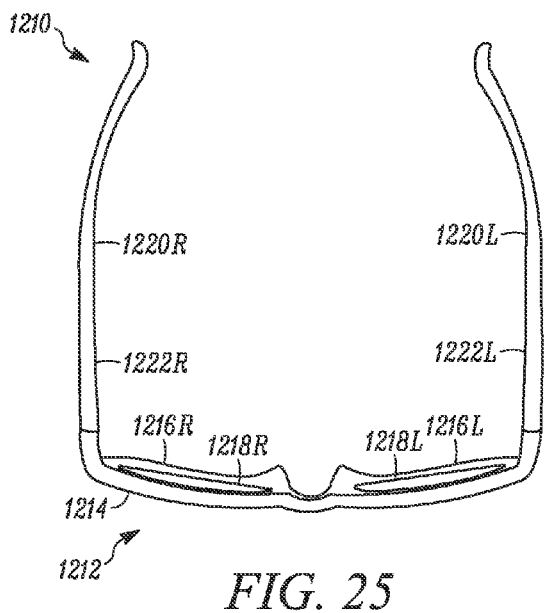
FIG. 25 illustrates a top view of the article of eyewear of FIG. 22.

The left temple arm 1220L and the right temple arm 1220R define a left accessory attachment feature 1222L and a right accessory attachment feature 1222R, respectively. The left accessory attachment feature 1222L and the right accessory attachment feature 1222R each detachably or interchangeably mounts an accessory 1224, such as the accessory 124 described above. The accessory attachment features 1222L and 1222R are generally similar and, as such, only the left accessory attachment feature 1222L will be described in detail for simplicity. As shown in FIG. 23, the left accessory attachment feature 1222L includes a portion of a wall 1226 of the left temple arm 1220L. The wall 1226 may include one or more elastically deformable materials, such as plastics or the like. The wall 1226 also defines an accessory attachment opening 1228 that extends through the wall 1226 of the left temple arm 1220L in a thickness direction. That is, the accessory attachment opening 1228 extends from an inner or medial surface (not shown) of the left temple arm 1220L, which is disposed proximate the wearer's head, to an outer or lateral surface 1232 opposite the inner surface.

In some embodiments, the accessory attachment opening 1228 is shaped to inhibit an accessory 1224 from unintentionally detaching from the accessory attachment feature 1222L. In particular, the accessory attachment opening 1228 generally has an open-bottom "keyhole" shape. Such a shape includes a receiving portion 1242 that has an open-bottom trapezoidal shape of the open-bottom keyhole shape. The receiving portion 1242 includes an open lower side 1244 that facilitates ingress and egress of the accessory shank 138 from the accessory attachment opening 1228 in a direction that is substantially perpendicular to the thickness direction of the wall 1226.

Proceeding upwardly and away from the open side 1244, the accessory attachment opening 1228 tapers to an intermediate width 1246. In some embodiments, the intermediate width 1246 is less than the average diameter of the accessory shank 138. As such, the accessory attachment feature 1222L elastically deforms and flexes as the accessory shank 138 passes through the intermediate width 1246.

Proceeding upwardly and away from the intermediate width 1246, the receiving portion 1242 of the accessory attachment opening 1228 connects to a mounting portion 1248 that receives and detachably secures the accessory shank 138. The mounting portion 1248 has a partially-circular shape of the open-bottom keyhole shape. The mounting portion 1248 has a width, or diameter, that is greater than the intermediate width 1246.

In some embodiments, the accessory attachment feature 1222L is further shaped to facilitate securement to an accessory 1224 having the shoulders 134, 140 and the tapered shank 138 described above. In particular, the accessory attachment opening 1228 is defined by a tapered intermediate surface 1250. The tapered intermediate surface 1250 tapers inwardly proceeding from the outer surface 1232 to the inner surface of the wall 1226. In some embodiments, the height and angle of the tapered intermediate surface 1250 matches those of the accessory shank 138 to facilitate surface contact with the shank 138.

Figure 26:
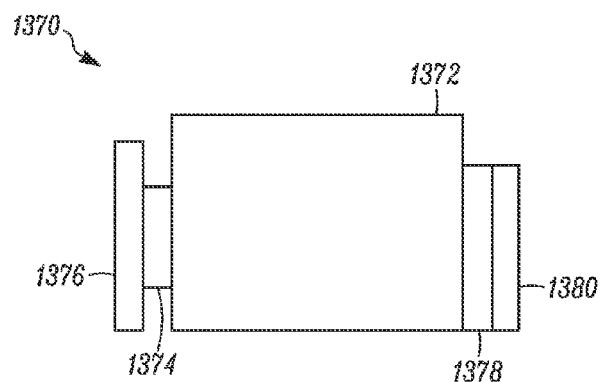
FIG. 26 illustrates a side view of a detachable hinge for an article of eyewear.

FIG. 26 illustrates a detachable hinge 1370 for pivotably connecting a front frame and a temple arm of an article of eyewear. The hinge 1370 may include various materials, such as plastics (for example, a copolymer resin foam, such as ethylene vinyl acetate (EVA)), metals, combinations thereof, and the like. The hinge 1370 may have various dimensions, including those shown in FIG. 26.

The hinge 1370 includes a main body 1372 that has a generally three-dimensional rectangular shape. On a first side, the main body 1372 connects to a first connection portion 1374, which in turn connects to a vertical portion 1376. The first connection portion 1374 and the vertical portion 1376 may be similar to those described in U.S. Pat. No. 8,083,345, the disclosure of which is hereby incorporated by reference in its entirety. The first connection portion 1374 and the vertical portion 1376 are pivotally and detachably received in a pivot seat (not shown) defined by the front frame. The pivot seat may be similar to that described in U.S. Pat. No. 8,083,345.

On a second side, the main body 1372 connects to a second connection portion 1378, which in turn connects to a mounting feature 1380. As viewed from above, the second connection portion 1378 and the mounting feature 1380 together define a mounting shape (for example, a T-shaped cross-section). The second connection portion 1378 and the mounting feature 1380 are received in a hole that has the inverse of the mounting shape (not shown; for example, a T-shaped hole) defined by the temple arm to detachably secure the hinge 1370 to the temple arm.

Figure 27:
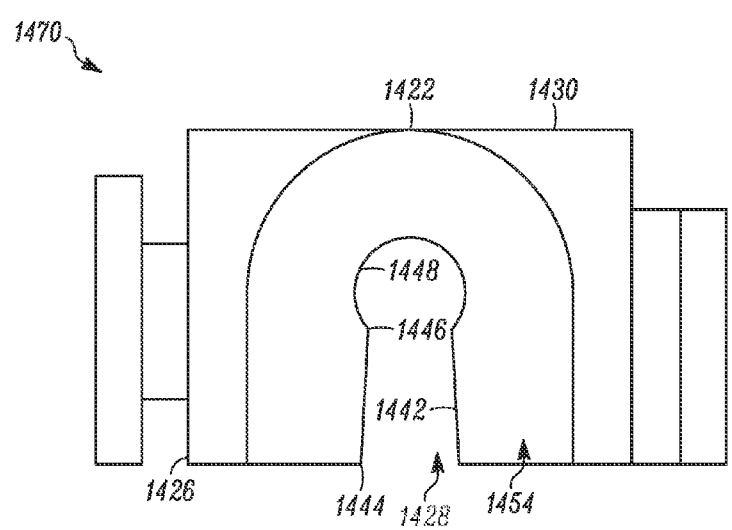
FIG. 27 illustrates a side view of a detachable hinge for detachably connecting an accessory to an article of eyewear in accordance with an embodiment of the present invention.
Figure 28:
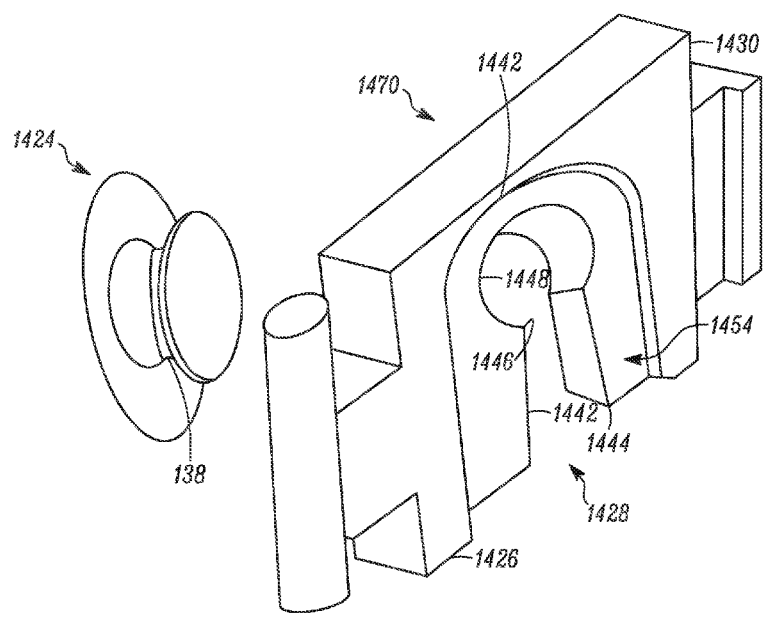
FIG. 28 illustrates a perspective view of the detachable hinge of FIG. 27 and a detachably connectable accessory.
Figure 29:
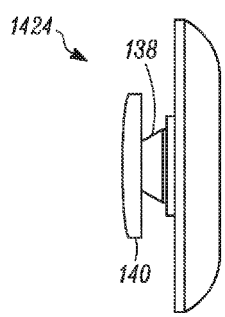
FIG. 29 illustrates a side view of the detachably connectable accessory of FIG. 28.
Figure 30:
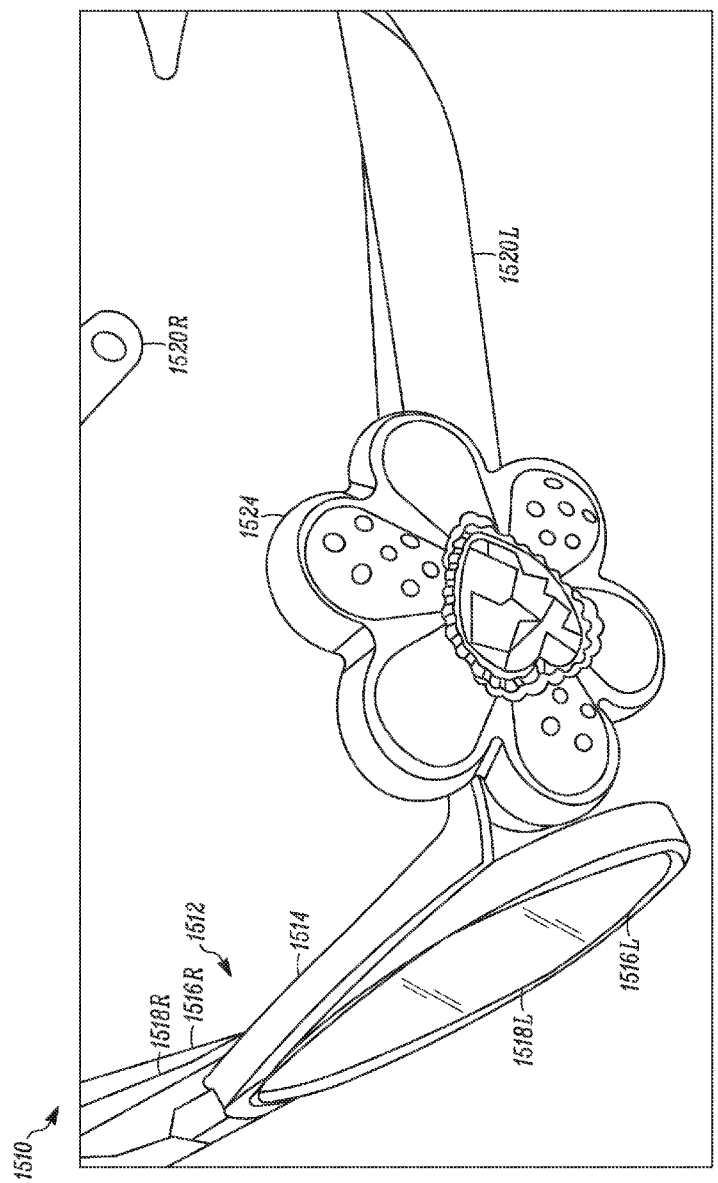
FIG. 30 illustrates a perspective view of an article of eyewear in accordance with an embodiment of the present invention detachably supporting an accessory.
Figure 31:
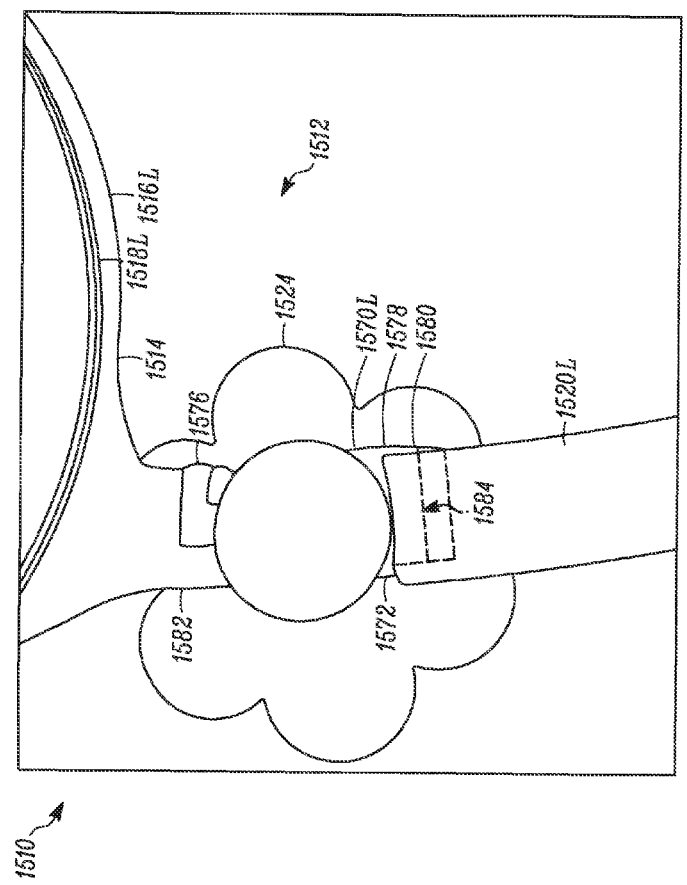
FIG. 31 illustrates a side view of the article of eyewear and the accessory of FIG. 30.

FIGS. 27 and 28 illustrate a detachable hinge 1470 in accordance with an embodiment of the present invention, and FIG. 29 illustrates an accessory 1424 that may be detachably connected to the hinge 1470. The detachable hinge 1470 is similar to the detachable hinge 1370 described above, and the accessory 1424 is similar to the accessory 124. The detachable hinge 1470 also includes an accessory attachment feature 1422. The accessory attachment feature 1422 includes a wall 1426 formed one or more elastically deformable materials, such as plastics or the like. The wall 1426 also defines an accessory attachment opening 1428 that extends through the wall 1426 in a thickness direction. That is, the accessory attachment opening 1428 extends from an inner or medial surface 1430 to an outer or lateral surface (not shown) opposite the inner surface 1430.

In some embodiments, the accessory attachment opening 1428 is shaped to inhibit the accessory 1424 from unintentionally detaching from the accessory attachment feature 1422. In particular, the accessory attachment opening 1428 generally has an open-bottom "keyhole" shape. Such a shape includes a receiving portion 1442 that has an open-bottom trapezoidal shape of the open-bottom keyhole shape. The receiving portion 1442 includes an open lower side 1444 that facilitates ingress and egress of the accessory shank 138 from the accessory attachment opening 1428 in a direction that is substantially perpendicular to the thickness direction of the wall 1426. In some embodiments, the open side 1444 has a width that is about 5.05 mm.

Proceeding upwardly and away from the open side 1444, the accessory attachment opening 1428 tapers to an intermediate width 1446. In some embodiments, the intermediate width 1446 is about 4.05 mm. As such, the accessory attachment feature 1422 elastically deforms and flexes as the accessory shank 138 passes through the intermediate width 1446.

Proceeding upwardly and away from the intermediate width 1446, the receiving portion 1442 of the accessory attachment opening 1428 connects to a mounting portion 1448 that receives and detachably secures the accessory shank 138. The mounting portion 1448 has a partially-circular shape of the open-bottom keyhole shape. The mounting portion 1448 has a width, or diameter, that is greater than the intermediate width 1446. In some embodiments, the mounting portion 1448 has a width, or diameter, that is about 5 mm.

In some embodiments, the accessory attachment feature 1422 further includes a second shoulder-receiving recess 1454 that is disposed proximate the inner surface 1430 of the wall 1426. The second shoulder-receiving recess 1454 generally has an inverted U-shape and extends about the accessory attachment opening 1428. The second shoulder-receiving recess 1454 may have a radius (proximate the mounting portion 1448) of about 7.86 mm. The second shoulder-receiving recess 1454 may have a width (proximate the mounting portion 1442) of about 15.72 mm. The second shoulder-receiving recess 1454 is configured to receive the second accessory shoulder 140 when the accessory shank 138 is disposed within the accessory attachment opening 1428.

FIGS. 30-34 illustrate an article of eyewear 1510 in accordance with an embodiment of the present invention. The article of eyewear 1510 includes a frame 1512 that in turn includes a front frame 1514. The front frame 1514 defines a left aperture 1516L and a right aperture 1516R that receive a left lens 1518L and a right lens 1518R, respectively. The sides of the front frame 1514 pivotably connect to a left temple arm 1520L and a right temple arm 1520R via a left detachable hinge 1570L and a right detachable hinge (not shown), respectively.

The left detachable hinge 1570L and the right detachable hinge are generally similar and, as such, only the left detachable hinge 1570L will be described in detail for simplicity. The detachable hinge 1570L is similar to the detachable hinge 1370 described above. That is, the detachable hinge 1570L may include various materials, such as deformable plastics (for example, a copolymer resin foam, such as ethylene vinyl acetate (EVA)) or the like.

The hinge 1570L includes a main body 1572 that has a generally three-dimensional rectangular shape. On a first side, the main body 1572 connects to a first connection portion 1574, which in turn connects to a vertical portion 1576. The first connection portion 1574 and the vertical portion 1576 may be similar to those described in U.S. Pat. No. 8,083,345. The first connection portion 1574 and the vertical portion 1576 are pivotally and detachably received in a pivot seat 1582 defined by the front frame. The pivot seat may be similar to that described in U.S. Pat. No. 8,083,345.

On a second side, the main body 1572 connects to a second connection portion 1578, which in turn connects to a mounting feature 1580. As viewed from above, the second connection portion 1578 and the mounting feature 1580 together define mounting shape (for example, a T-shaped cross-section). The second connection portion 1578 and the mounting feature 1580 are received in a hole 1584 that has the inverse of the mounting shape (for example, a T-shaped hole) defined by the temple arm 1520L to detachably secure the hinge 1570 to the temple arm 1520L.

The detachable hinge 1570L also includes an accessory attachment feature 1522 for detachably or interchangeably mounting one or more accessories 1524, such as the accessory 124 described above. The accessory attachment feature 1522 is defined by the main body 1572, the second connection portion 1578, and the mounting feature 1580 of the hinge 1570L. The accessory attachment feature 1522 includes an accessory attachment opening 1528 that extends through the hinge 1570L in a thickness direction. That is, the accessory attachment opening 1528 extends from an inner or medial surface 1530 to an outer or lateral surface 1532 opposite the inner surface 1530.

Figure 32:
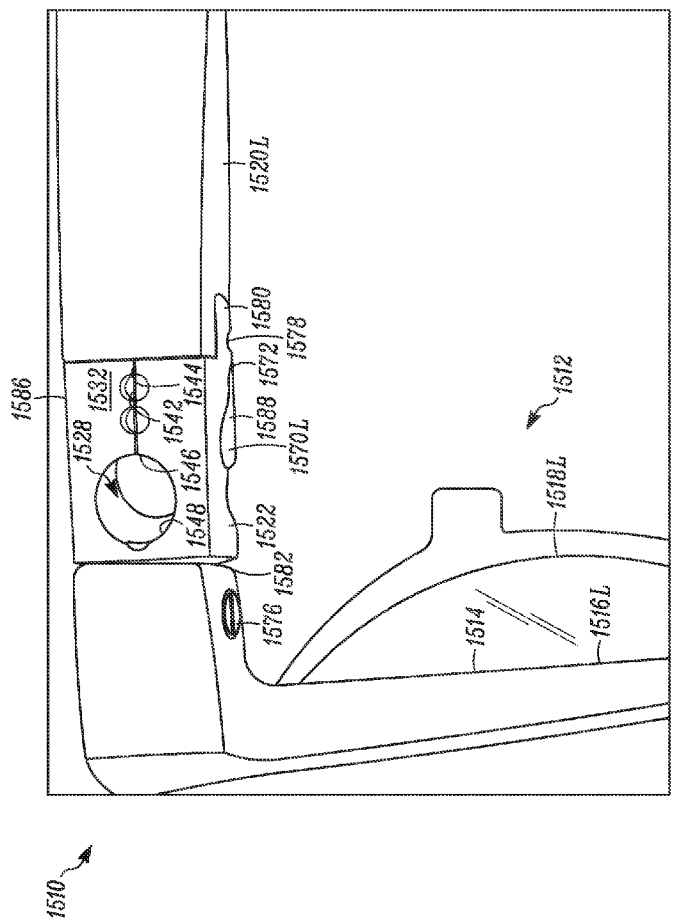
FIG. 32 illustrates a perspective view of the article of eyewear of FIG. 30 with the accessory detached.
Figure 33:
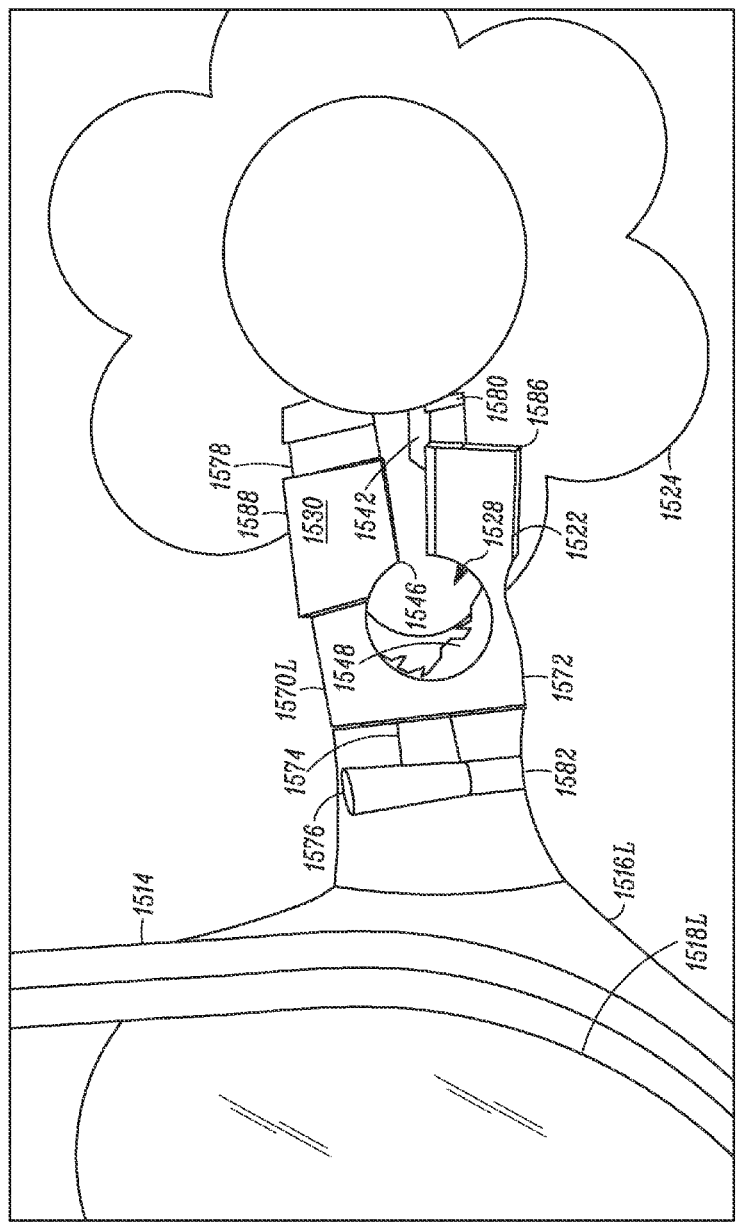
FIG. 33 illustrates an inverted side view a detachable hinge of the article of eyewear of FIG. 30 receiving the accessory.
Figure 34:
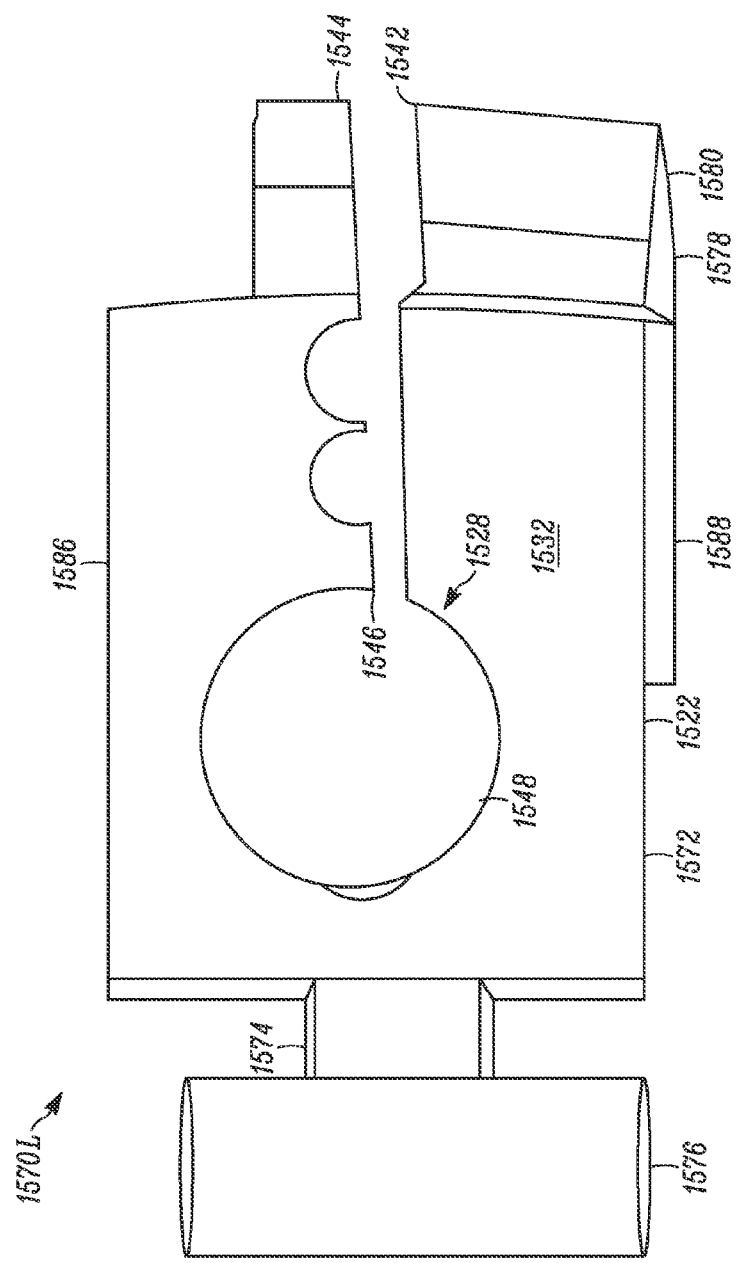
FIG. 34 illustrates a side view of the detachable hinge of the article of eyewear of FIG. 30 detached from the article of eyewear.

In some embodiments, the accessory attachment opening 1528 is adapted to secure the accessory 1524 when the hinge 1570L is connected to the temple arm 1520L (see FIG. 32). Conversely, the accessory attachment opening 1528 is adapted to permit attachment and detachment of the accessory 1524 when the hinge 1570L is disconnected from the temple arm 1520L (see FIGS. 33 and 34). To this end, the accessory attachment opening 1528 is defined by an upper portion 1586 and a lower portion 1588 of the main body 1572, the second connection portion 1578, and the mounting feature 1580. When the hinge 1570L is disconnected from the temple arm 1520L, the upper portion 1586 and the lower portion 1588 may be separated to permit attachment and detachment of the accessory 1524.

When separated, the upper portion 1586 and the lower portion 1588 provide the accessory attachment opening 1528 with a generally horizontal, open-side "keyhole" shape. Such a shape includes a receiving portion 1542 that has an open-side trapezoidal shape of the open-side keyhole shape. The receiving portion 1542 includes an open side 1544 that facilitates ingress and egress of the accessory shank 138 from the accessory attachment opening 1528 in a direction that is substantially perpendicular to the thickness direction of the hinge 1570L.

Proceeding forwardly and away from the open side 1544, the accessory attachment opening 1528 tapers to an intermediate width 1546. In some embodiments, the intermediate width 1546 is less than the width of the open side 1544. As such, the accessory attachment feature 1522 elastically deforms and flexes as the accessory shank 138 passes through the intermediate width 1546.

Proceeding forwardly and away from the intermediate width 1546, the receiving portion 1542 of the accessory attachment opening 1528 connects to a mounting portion 1548 that receives and detachably secures the accessory shank 138. The mounting portion 1548 has a partially-circular shape of the open-side keyhole shape. The mounting portion 1548 has a width, or diameter, that is greater than the intermediate width 1546.

Figure 35:
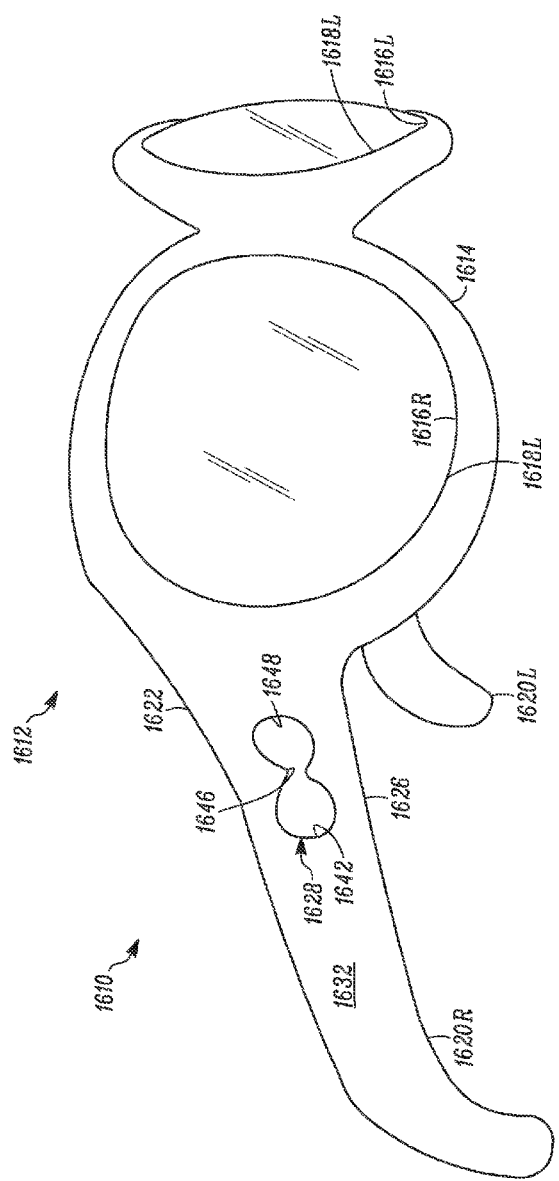
FIG. 35 illustrates a perspective view of an article of eyewear in accordance with an embodiment of the present invention.

FIG. 35 illustrates an article of eyewear 1610 in accordance with an embodiment of the present invention. The article of eyewear 1610 includes a frame 1612 that in turn includes a front frame 1614. The front frame 1614 defines a left aperture 1616L and a right aperture 1616R that receive a left lens 1618L and a right lens 1618R, respectively. The sides of the front frame 1614 pivotably connect to a left temple arm 1620L and a right temple arm 1620R.

The right temple arm 1620R defines an accessory attachment feature 1622 for detachably or interchangeably mounting one or more accessories (not shown), such as the accessory 124 described above. The accessory attachment feature 1622 includes a portion of a wall 1626 of the left temple arm 1620L. The wall 1626 may include one or more elastically deformable materials, such as plastics or the like. The wall 1626 also defines an accessory attachment opening 1628 that extends through the wall 1626 of the right temple arm 1620R in a thickness direction. That is, the accessory attachment opening 1628 extends from an inner or medial surface (not shown) of the right temple arm 1620R, which is disposed proximate the wearer's head, to an outer or lateral surface 1632 opposite the inner surface.

In some embodiments, the accessory attachment opening 1628 has an "overlapping circles" shape. Such a shape includes a first receiving portion 1642 that has a first circular shape of the overlapping circles shape. Proceeding forwardly from the receiving portion 1642, the accessory attachment opening 1628 tapers to an intermediate width, or height, 1646. Proceeding forwardly from the intermediate width 1646, the first receiving portion 1642 of the accessory attachment opening 1628 connects to a second receiving portion 1648 that has a second circular shape of the overlapping circles shape. The mounting portion 1648 has a width, or diameter, that is greater than the intermediate width 1646. In some embodiments, the receiving portions 1642 and 1648 have widths, or diameters, that are substantially equal.

Various modifications and additions can be made to the exemplary embodiments discussed without departing from the scope of the present invention. For example, while some of the figures include specific structural dimensions, the scope of this invention also includes embodiments having different dimensions. As another example, while the embodiments described above refer to particular features, the scope of this invention also includes embodiments having different combinations of features and embodiments that do not include all of the above described features.

The following is claimed:

1. An article of eyewear, comprising:
    a frame including:
        a front frame defining a left aperture and a right aperture;
        a left temple arm supported by the front frame;
        a right temple arm supported by the front frame; and
    an accessory attachment opening adapted to detachably receive an accessory, the accessory attachment opening extending through the frame from an inner surface of the frame to an outer surface of the frame in a thickness direction, the inner surface of the frame configured to be disposed proximate a wearer's head when the article of eyewear is worn by the wearer, the outer surface of the frame opposite the inner surface, the thickness direction extending between the inner and outer surfaces of the frame, the accessory attachment opening including an open side adapted to facilitate ingress and egress of the accessory from the accessory attachment opening in a direction substantially perpendicular to the thickness direction;
    wherein the accessory attachment opening includes:
        a receiving portion adapted to receive the accessory and including the open side, the open side having a first width; and
        a mounting portion adapted to receive the accessory from the receiving portion, and the mounting portion having a second width;
        wherein the accessory attachment portion tapers to a third width between the receiving portion and the mounting portion, the third width being less than the first width and the second width.

2. The article of eyewear of claim 1, wherein one of the left temple arm and the right temple arm defines the accessory attachment opening.

3. The article of eyewear of claim 1, wherein the accessory attachment opening has a cross-sectional shape that tapers inwardly in the thickness direction of the frame.

4. The article of eyewear of claim 3, wherein the cross-sectional shape of the accessory attachment opening tapers inwardly from proximate the outer surface to proximate the inner surface.

5. An article of eyewear, comprising:
    a frame including:
        a front frame defining a left aperture and a right aperture;
        a left temple arm supported by the front frame;
        a right temple arm supported by the front frame;
    an accessory attachment opening adapted to detachably receive an accessory and extending through a portion of the frame and, the accessory attachment opening including:
        a receiving portion adapted to receive the accessory and having a first width; and
        a mounting portion adapted to receive the accessory from the receiving portion, and the mounting portion having a second width;
        wherein the accessory attachment portion tapers to a third width between the receiving portion and the mounting portion; the third width being less than the first width and the second width, wherein the accessory attachment opening has an open-bottom keyhole shape.

6. The article of eyewear of claim 5, wherein the mounting portion has a partially circular shape of the open-bottom keyhole shape.

7. The article of eyewear of claim 5, wherein the receiving portion has an open-bottom trapezoidal shape of the open-bottom keyhole shape.

8. The article of eyewear of claim 5, wherein the accessory attachment opening extends through the portion of the frame in a thickness direction, the thickness direction being substantially perpendicular to the third width.

9. The article of eyewear of claim 8, wherein the accessory attachment opening has a cross-sectional shape that tapers inwardly in the thickness direction.

10. The article of eyewear of claim 5, further comprising:

a left lens supported by the front frame in the left aperture; and a right lens supported by the front frame in the right aperture.

11. The article of eyewear of claim 10, wherein the left lens is a tinted lens and the right lens is a tinted lens.

12. The article of eyewear of claim 5, wherein the left temple arm pivotably connects to the front frame and the right temple arm pivotably connects to the front frame.

13. An article of eyewear, comprising:
a frame including:
a front frame defining a left aperture and a right aperture;
a left temple arm supported by the front frame;
a right temple arm supported by the front frame; and
an accessory attachment opening adapted to detachably receive an accessory and extending from an inner surface of the frame to an outer surface of the frame in a thickness direction, the inner surface of the frame configured to be disposed proximate a wearer's head when the article of eyewear is worn by the wearer, the outer surface of the frame opposite the inner surface, the thickness direction extending between the inner and outer surfaces of the frame, the accessory attachment opening having a cross-sectional shape that tapers inwardly in the thickness direction of the frame.

14. The article of eyewear of 13, wherein the cross-sectional shape of the accessory attachment opening tapers inwardly from proximate the outer surface to proximate the inner surface.

15. The article of eyewear of 14, wherein one of the left temple arm and the right temple arm defines the accessory attachment opening.

\* \* \* \* \*